Aug. 25, 1925.
F. D. CHAPMAN
1,551,134
CONTINUOUS COOKER DISCHARGE MECHANISM
Filed June 25, 1923    3 Sheets-Sheet 1
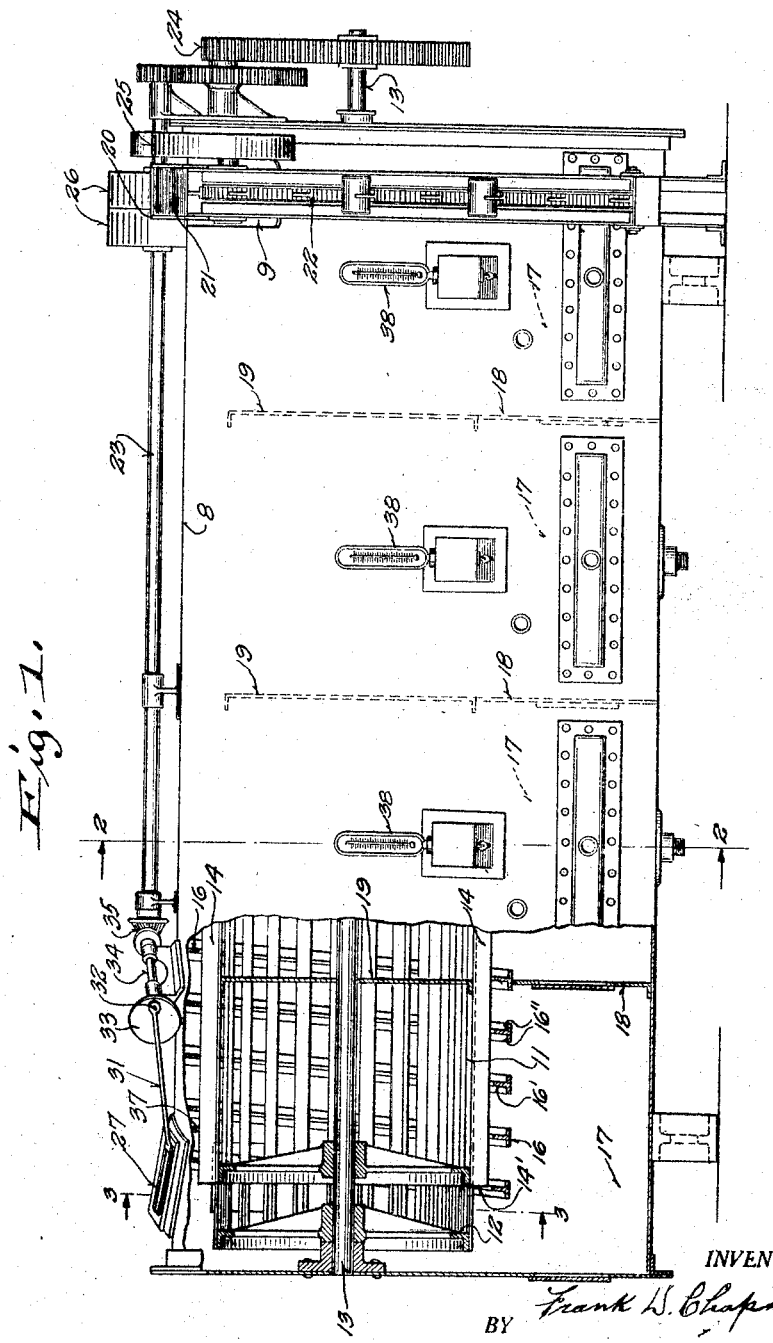
INVENTOR.
Frank D. Chapman.
BY
Morsell, Keeney & Morsell
ATTORNEYS Aug. 25, 1925.
F. D. CHAPMAN
1,551,134
CONTINUOUS COOKER DISCHARGE MECHANISM
Filed June 25, 1923     3 Sheets-Sheet 2
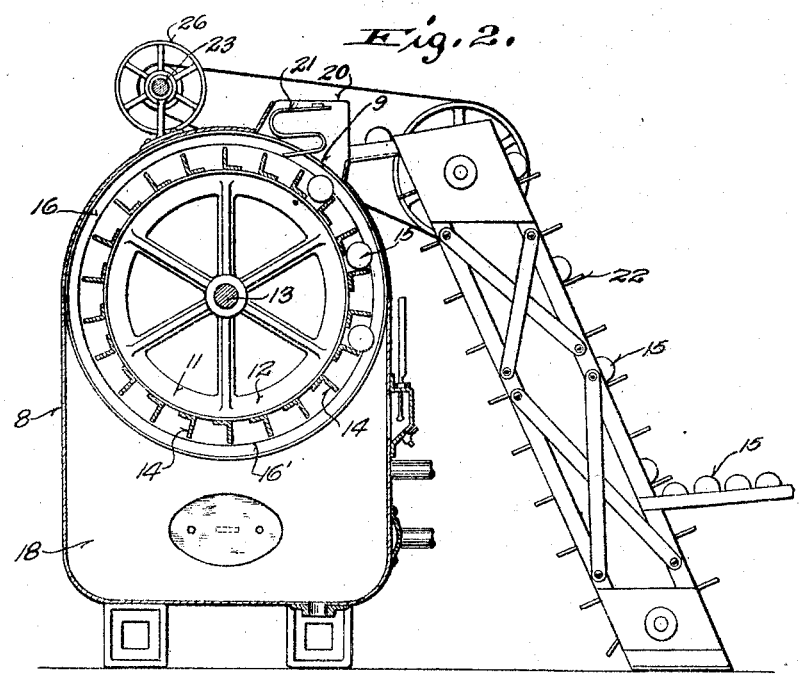
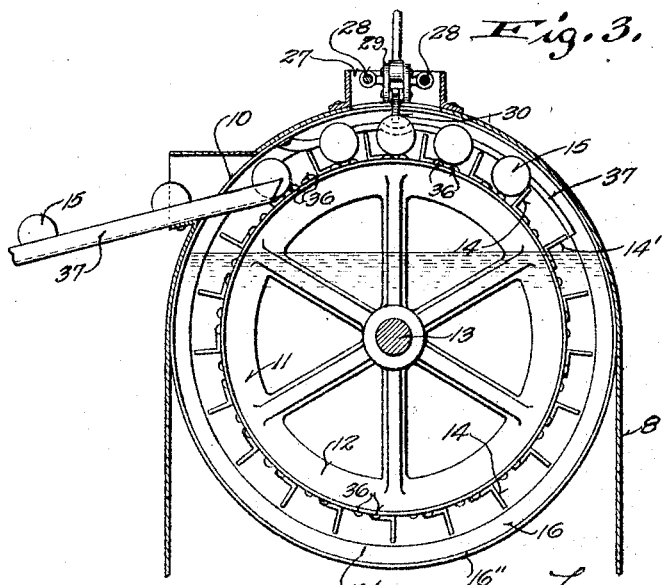
INVENTOR.
Frank D. Chapman,
BY Morsell, Keeney & Morsell
ATTORNEYS.

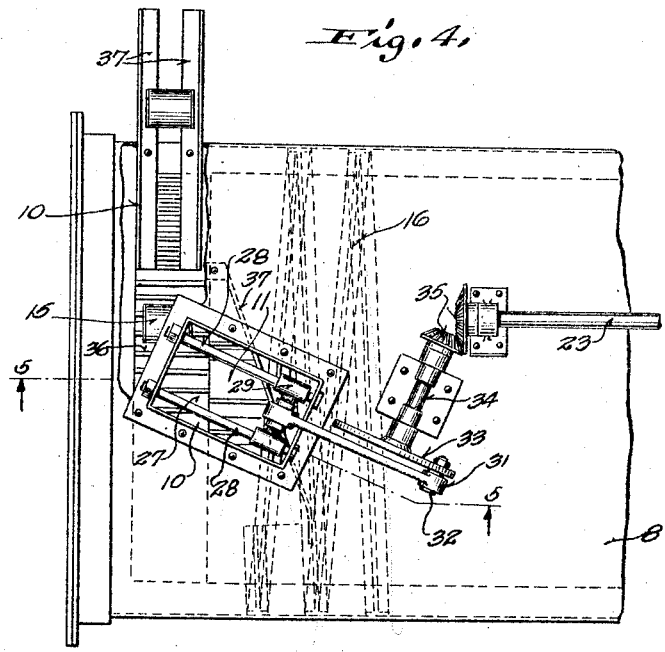

Patented Aug. 25, 1925.

1,551,134

UNITED STATES PATENT OFFICE.

FRANK D. CHAPMAN, OF BERLIN, WISCONSIN, ASSIGNOR TO BERLIN-CHAPMAN COMPANY, OF BERLIN, WISCONSIN, A CORPORATION OF WISCONSIN.

CONTINUOUS-COOKER DISCHARGE MECHANISM.

Application filed June 25, 1923. Serial No. 647,660.

*To all whom it may concern:*

Be it known that I, FRANK D. CHAPMAN, a citizen of the United States, and resident of Berlin, in the county of Green Lake and State of Wisconsin, have invented new and useful Improvements in Continuous-Cooker Discharge Mechanism, of which the following is a description, reference being had to the accompanying drawings, which are a part of this specification.

This invention relates to improvements in continuous cooker discharge mechanism.

It is one of the objects of the present invention to provide a continuous cooker discharge mechanism in which the cans or food containers are discharged from the cooking drum above the level of the water within the drum and from the ends of the drum angles which form part of the means for moving the cans through the drum.

A further object of the invention is to provide a continuous cooker discharge mechanism in which the cans are positively moved endwise from the drum angles and then rolled outwardly from the drum.

A further object of the invention is to provide a continuous cooker discharge mechanism which is of simple construction, is strong and durable, and is well adapted for the purpose described.

With the above and other objects in view, the invention consists of the improved continuous cooker discharge mechanism and its parts and combinations as set forth in the claims, and all equivalents thereof.

In the accompanying drawings, in which the same reference characters indicate the same parts in all of the views:

Fig. 1 is a side view of a continuous cooker provided with the improved discharge mechanism, parts being broken away to show interior construction;

Fig. 2 is a transverse sectional view thereof taken on line 2—2 of Fig. 1;

Fig. 3 is a transverse sectional detail view taken on a larger scale, on line 3—3 of Fig. 1;

Fig. 4 is a top view of the discharging end portion of the cooker; and

Fig. 5 is a sectional detail view taken on line 5—5 of Fig. 4.

Referring to the drawings, the numeral 8 indicates a horizontally extending tank having an inlet opening 9 at its upper portion adjacent one end and an outlet opening 10 in its upper portion near its other end. Said openings are above the water level maintained in said tank. The tank, which in cross section has a semicircular upper portion and a rectangular lower portion, in its upper portion is provided with a rotary carrier 11 concentric to said upper portion. The said carrier comprises two spoked heads or spiders 12 mounted on the opposite ends of a shaft 13 and connected together by longitudinally extending angle bars 14 which have one of their angled portions extending radially and the other circumferentially. Said bars extend in parallel relation to the shaft and are of less distance apart than the diameter of cans or food containers 15 so that said cans cannot pass therebetween. The bars coact with a spirally trending guide track member 16 which is positioned within the tank and surrounds the carrier and is supported from the upper rounded portion of the tank. The said guiding member is formed of metal of T-shape in cross section with the stem portion 16′ of the T extending radially inwardly to form a continuous end guide for the cans, while the outer cross portions 16″ form guides for the side edge portions of the cans. The convolutions of the spiral member are spaced apart a sufficient distance to permit a can to roll on the cross portions and between the stem portions while being moved by the carrier and advanced by the spiral member. The tank and the carrier are divided into a plurality of compartments 17 by partitions 18 and 19 to permit maintaining different temperatures in the different compartments.

The charging opening 9 is formed with side guide wings 20 and an S-shaped spring member 21 for deflecting the cans downwardly into the tank. An endless elevator 22 adjacent the charging opening is arranged to feed cans through said opening 9 to the rotary carrier 11 within the tank. The cans in passing from the elevator to the carrier are engaged by the spring 3 and yieldingly forced into position between the convolutions of the spiral guide 16 and the carrier bars 14.

A drive shaft 23 mounted above the tank has a gear connection 24 with the carrier shaft 13 and a belted connection 25 with the endless elevator 22. Belt wheels 26 mounted on the drive shaft 23 are adapted to be connected to a source of power.

The upper discharge end portion of the tank is provided with a rectangular opening 27 which is positioned diagonally with relation to the tank. Parallel guide bars 28 also extending diagonally with relation to the carrier shaft are mounted in the opening 27 and carry a reciprocal member 29 provided with a pivoted dog 30. The said reciprocal member is connected to and actuated by a connecting rod 31, which at its opposite end is connected to the wrist pin 32 of a disk member 33. A short shaft 34 upon which the disk member is mounted has a geared connection 35 with the shaft 23 and is driven thereby.

The discharge ends 14' of the carrier bars 14 and the spiral guide 16 terminate at a greater distance from the adjacent end of the carrier than the length of the cans 15 and the remaining portion of the carrier is provided with longitudinally extending ribs 36 for receiving the cans therebetween and carrying them to the discharge opening 10. When the cans reach the end of the spiral member they are endwise engaged by an obliquely extending curved deflecting member 37 which moves them endwise towards the end of the tank to a position to permit the shouldered portion 30' of the dog 30 to drop over the rear edge of each can in successive order and then permit the dog to move the cans endwise from the spaces between the carrier bars to positions in which they rest between the ribs 36. When resting on said ribs the rotation of the carrier will carry the cans downwardly and when in register with the discharge opening 11 they will roll off the ribs and out of the tank by gravity onto the guide members 37 are indicated in Fig. 3.

It will be noted that the dog 30 moves at an angle with relation to the axis of the carrier and that this angle bears a particular relation to the movement of the can while on the carrier to provide for the dog moving laterally with the movement of the carrier while the dog is moving the can endwise, thus insuring the positive engagement of the dog with the can while being moved endwise.

Thermometers 38 mounted on the tank and projecting outwardly from each compartment provide visible means indicating the temperatures within the compartments.

It is, of course, understood that the tank is partly filled with hot water as indicated in Fig. 3, and that the cans of food passed therethrough by the rotary carrier will be cooked during said passage, thus forming a continuous operation of the machine. It will be further understood that as the inlet and outlet openings are above the level of the water maintained in the tank the feeding and discharging operation may be continuous.

From the foregoing description, it will be seen that the continuous cooker discharge mechanism is of very simple construction and provides for the positive and continuous discharge of the cans from the tank above the water level in said tank.

What I claim as my invention is:

1. A continuous cooker, comprising a tank member having inlet and outlet openings, means for moving cans in a spiral path from the inlet opening to a position adjacent the outlet opening, and other means for engaging the cans and positively moving them endwise while still being moved by the spiral path means to a position to discharge by gravity sideways through the outlet opening of the tank.

2. A continuous cooker, comprising a tank member having inlet and outlet openings in its upper portion, a rotary member for moving cans in a spiral path from the inlet opening to a position adjacent the outlet opening, and other means for engaging the cans and positively moving them endwise while still being moved by the rotary means to a position to discharge through the outlet opening of the tank.

3. A continuous cooker, comprising a tank member having inlet and outlet openings in its upper portion, a rotary member for moving cans in a spiral path from the inlet opening to a position adjacent the outlet opening, and a reciprocal means for engaging the cans and positively moving them endwise to a position to discharge by gravity through the outlet opening of the tank while still being moved by the rotary means.

4. A continuous cooker, comprising a tank member having an inlet opening in its upper portion adjacent one end and an outlet opening in its upper portion adjacent the opposite end of the tank, a rotary member for moving cans from the inlet opening to a position near the outlet opening, and a reciprocal means for moving the cans endwise to a position in alinement with the outlet opening while being moved towards said opening by the rotary means.

5. A continuous cooker, comprising a tank member having an inlet opening in its upper portion adjacent one end and an outlet opening in its upper portion adjacent the opposite end of the tank, a rotary member for moving cans from the inlet opening to a position near the outlet opening, and a reciprocal member having a dog which engages the rear ends of the cans and moves them endwise diagonally to a position in alinement with the outlet opening while being moved towards said opening by the rotary means.

6. A continuous cooker, comprising a horizontal tank member having an inlet opening in its upper portion adjacent one end and an outlet opening in its upper portion near its opposite end, a rotary member for moving cans from the inlet opening to a position near the outlet opening, guide means mounted on the tank above the rotary member and extending in a line diagonally with relation to the axis of the rotary member, and a reciprocal member carried by the guide means and having a dog which engages the rear ends of the cans and moves them endwise diagonally to a position in alinement with the outlet opening while being moved towards said opening by the rotary means.

7. A continuous cooker, comprising a horizontal tank member having an inlet opening in its upper portion adjacent one end and an outlet opening in its upper portion near its opposite end, a spirally trending member within the tank, a rotary member having parallel bars which coact with the spirally trending member in moving cans from the inlet opening to a position near the outlet opening, said parallel bars terminating short of the discharging end of the rotary member, ribs extending longitudinally from the terminating end portions of the parallel bars, and a reciprocal member having means for engaging the rear end portions of the cans and move them endwise free from the parallel bars and onto the longitudinal ribs while said ribs are moving towards the outlet opening.

8. A continuous cooker, comprising a horizontal tank member having an inlet opening in its upper portion near its opposite end, a spirally trending member within the tank, a rotary member having parallel bars which coact with the spirally trending member in moving cans from the inlet opening to a position near the outlet opening, said parallel bars terminating short of the discharging end of the rotary member, ribs extending longitudinally from the terminating end portions of the parallel bars, a guide means positioned above the rotary member, and a reciprocal member mounted on the guides and having a dog which engages the rear ends of the cans in successive order to move said cans endwise free from the parallel bars and onto the longitudinal ribs while said ribs are moving towards the outlet opening.

9. A continuous cooker, comprising a horizontal tank member having an inlet opening in its upper portion adjacent one end and an outlet opening in its upper portion near its opposite end, a spirally trending member within the tank, a rotary member having parallel bars which coact with the spirally trending member in moving cans from the inlet opening to a position near the outlet opening, said parallel bars terminating short of the discharging end of the rotary member, ribs extending longitudinally from the terminating end portions of the parallel bars, a guide means positioned above the rotary member and extending diagonally with relation to the longitudinal line of the tank, a reciprocal member mounted on the guides and having a dog which engages the rear ends of the cans in successive order to move said cans endwise and free from the parallel bars and onto the longitudinal ribs while said ribs are moving towards the outlet opening, and means for reciprocating the reciprocal member.

10. A continuous cooker, comprising a horizontal tank member having an inlet opening in its upper portion adjacent one end and an outlet opening in its upper portion near its opposite end, a spirally trending member within the tank, a rotary member having parallel bars which coact with the spirally trending member in moving cans from the inlet opening to a position near the outlet opening, said parallel bars terminating short of the discharging end of the rotary member, ribs extending longitudinally from the terminating end portions of the parallel bars, means for deflecting the cans endwise from the parallel bars, and a reciprocal member having means for engaging the rear end portions of the cans and moving them endwise free from the parallel bars and onto the longitudinal ribs while said ribs are moving towards the outlet opening.

11. A continuous cooker, comprising a tank member having inlet and outlet openings in its upper portion and a spirally trending member, a rotary member having longitudinal bars which coact with the spiral member in moving cans from the inlet opening to a position near the outlet opening, means for deflecting the cans from the longitudinal bars, and a reciprocal member for engaging and moving the cans endwise from their deflected position to a position in circumferential alinement with the outlet opening to permit them to be further moved by the rotary member and to roll out of the outlet opening of the tank.

12. A continuous cooker, comprising a tank member having inlet and outlet openings in its upper portion, a rotary means for moving the cans from the inlet opening to a position adjacent the outlet opening, and means for moving the cans endwise successively from said position to a position to be further moved circumferentially a short distance where they will roll outwardly through the outlet opening.

13. A continuous cooker, comprising a tank member having inlet and outlet openings in its upper portion, a rotary means for moving the cans from the inlet opening to a position adjacent the outlet opening, means for deflecting the cans endwise, and other means for moving the cans endwise successively from said position to a position to be further moved circumferentially a short distance where they will roll outwardly through the outlet opening.

14. A continuous cooker, comprising a horizontal tank member having inlet and outlet openings in its upper portion, a rotary means for moving the cans in a spiral path from the inlet opening to a position adjacent the outlet opening, means for deflecting the cans endwise a slight distance, and other means for moving the cans endwise from their deflected position to a position to be moved circumferentially a short distance where they will successively roll outwardly through the outlet opening.

15. A continuous cooker, comprising a tank member for containing water at a predetermined level and having inlet and outlet openings above said level, a rotary means for moving cans in a spiral path from the inlet opening through the water and to a position adjacent the outlet opening, and other means for engaging the cans and positively moving them endwise to a position to discharge by gravity sideways through the outlet opening of the tank.

16. A continuous cooker, comprising a tank member for containing water at a predetermined level and having inlet and outlet openings above said level, a rotary member for moving cans in a spiral path from the inlet opening through the water and to a position adjacent the discharge opening, and a reciprocal means for engaging the cans and positively moving them endwise to a position to discharge by gravity sideways through the outlet opening of the tank.

17. A continuous cooker, comprising a tank member for containing water and having an inlet opening in its upper portion adjacent one end and an outlet opening in its upper portion adjacent the opposite end of the tank, said openings being positioned above the level of the water in the tank, a rotary member for moving cans from the inlet opening to a position near the outlet opening, and a reciprocal means for moving the cans endwise to a position in alinement with the outlet opening while being moved towards said opening by the rotary means.

18. A continuous cooker, comprising a tank member for containing water and having an inlet opening in its upper portion adjacent one end and an outlet opening in its upper portion adjacent the opposite end of the tank, said openings being positioned above the level of the water in the tank, a rotary member for moving cans from the inlet opening to a position near the outlet opening, means for deflecting cans endwise, and a reciprocal means for moving the deflected cans endwise to a position in alinement with the outlet opening while being moved towards said opening by the rotary means.

In testimony whereof, I affix my signature.

FRANK D. CHAPMAN.